United States Patent [19]

Carlile et al.

[11] Patent Number: 4,972,450
[45] Date of Patent: Nov. 20, 1990

[54] X-RAY FILM CASSETTE

[75] Inventors: Dana A. Carlile, Webster; Jeffrey C. Robertson, Rochester, both of N.Y.

[73] Assignee: Eastman Kodak Company, Rochester, N.Y.

[21] Appl. No.: 498,132

[22] Filed: Mar. 22, 1990

[51] Int. Cl.[5] ..................... H05G 1/28; G03B 42/04
[52] U.S. Cl. .................................. 378/166; 378/165; 378/182
[58] Field of Search ............... 378/182, 187, 188, 165, 378/166

[56] References Cited

U.S. PATENT DOCUMENTS

| | | | |
|---|---|---|---|
| 2,077,500 | 4/1937 | Townsend et al. | 378/165 |
| 3,703,272 | 11/1972 | Lareau | 378/187 |
| 4,112,304 | 9/1978 | Huettner et al. | 378/182 |
| 4,259,586 | 3/1981 | Schmidt et al. | 378/187 |
| 4,264,821 | 4/1981 | Bauer | 378/187 |
| 4,313,538 | 2/1982 | Bauer et al. | 378/165 |

*Primary Examiner*—Janice A. Howell
*Assistant Examiner*—Kim Chin

*Attorney, Agent, or Firm*—G. Herman Childress

[57] ABSTRACT

An x-ray film cassette is disclosed which includes a window for allowing imaging of patient identification data onto a film in the cassette by light. The window includes a slidable member made from a single piece of plastics material folded onto itself to form two leaves. The two leaves are secured to one another except in a region adjacent the free end of one of the leaves. One of the leaves is stiff and the other is resiliently flexible. The stiff leaf faces outwardly of the cassette and has an aperture in a region overlying the unsecured region to the flexible leaf to allow a probe to deflect the unsecured region of the flexible leaf. The free end of the flexible leaf has catch means which cooperate with other catch means to prevent movement of the slidable member away from the closed position when the free end region of the second leaf is in the non-deflected condition. The catch means and the other catch means are disengaged from one another when the free end region of the flexible leaf has been deflected by a probe, thereby allowing the slidable member to move to the open position.

5 Claims, 7 Drawing Sheets

X-RAY FILM CASSETTE

BACKGROUND OF THE INVENTION

1. Field of the Invention

This invention relates to x-ray film cassettes which are opaque to light but at least one side of which is transparent to X-rays and which have a window for allowing imaging of information on the film in the cassette, by light.

2. Description Relative to the Prior Art

X-ray film cassettes are known which include a housing for receiving a sheet of X-ray film for exposure to X-rays for imaging a portion of the anatomy. The housing is opaque to light and serves to keep light from the film. It is known that it is very important to associate a sheet of film bearing an image, with the correct patient. To achieve this objective, it is known to image onto the film sheet while it is in the cassette and before processing, details identifying the patient and, perhaps, other information. This imaging of patient identification information is performed with light. U.S. Pat. specification No. 4,313,538 describes a window which is openable to allow imaging of the information and closeable to maintain the light integrity when information is not to be imaged and when the cassette is in the light. It is known that the window may contain a slidable member and that there be a catch for holding the slidable member in the window closed position. The catch is released by a probe associated with a device for projecting a light image of the information onto the film. The probe may also serve for moving the slidable member between its window open and window closed positions.

It is an object of the present invention to provide a superior window for an X-ray cassette.

SUMMARY OF THE INVENTION

The object of the present invention is achieved by a window which includes a member slidable relative to the remainder of the housing between a closed position excluding light from the region of the film intended to receive information and an open position allowing light to pass to the region. The slidable member has been formed from a single piece of plastics material which has been folded about a line at about the middle of its length, to form two leaves. A first of the leaves faces the outside of the housing. The second of the leaves is secured to the first of the leaves except adjacent the free end thereof remote from the fold line whereby the free end portion is resiliently deflectable away from the first leaf. The free end portion of the second leaf has catch means and other, cooperating catch means are associated with the remainder of the housing. The first leaf has an aperture in a region thereof overlying the free end portion of the second leaf. The aperture is adapted to allow access of a probe for deflecting the free end portion of the second leaf. The catch means and the other catch means are cooperable with one another for preventing movement of the slidable member from the aperture closing position when the free end portion of the second leaf is in an undeflected condition and for allowing sliding movement of the slidable member from the aperture closing position when the free end portion is in a deflected condition.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENT

Figure 1:
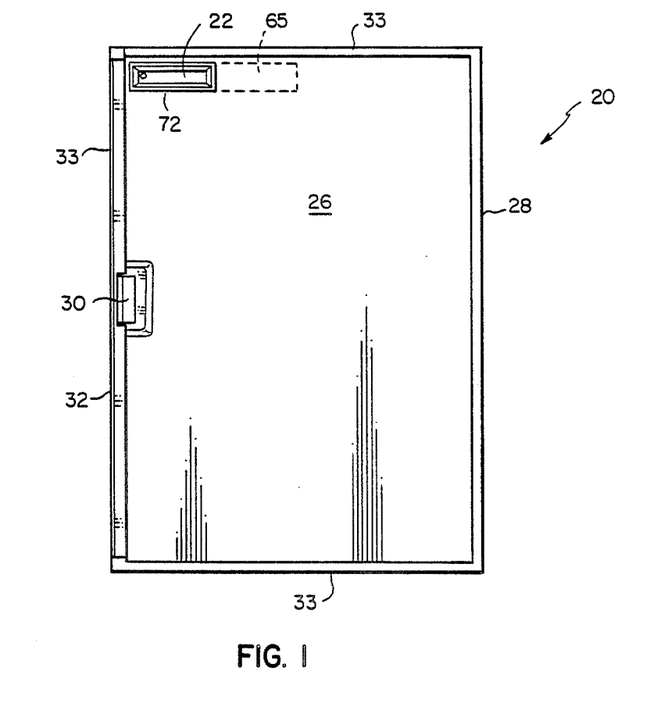
FIG. 1 is a plan view of an X-ray cassette in accordance with the present invention.

In FIG. 1 there is illustrated a cassette 20 of generally known form but having a novel patient identification window 22, in accordance with the present invention. In known manner, the cassette 20 includes two panels, only one, 26, of which is visible, hinged together along one edge 28. The panels are opaque to light and at least one of them is transparent to X-rays. A latch 30 for securing the panels in closed condition is located adjacent an edge 32 opposite the hinge edge 28. Light is prevented from entering the cassette by seals 33 around the peripheries of the panels, with the hinge forming the seal at the edge 28. The panels, hinge and seals may be regarded as forming a housing.

As is known, film within the cassette is exposed to X-rays when an image is taken of some portion of the anatomy. It is very desirable that the sheet of film bear information identifying the patient whose image is, or will be, on the film. The window 22 is used, in known manner, for exposing onto the film, with light, information identifying the patient and, perhaps, the date and other details. The window 22 has to be closeable to prevent light from being incident on the film at times other than when the identification information is being imaged onto the film. The window 22 is openable for the information imaging.

The window 22 is formed by a device 34 illustrated in FIGS. 2 to 7. The device 34 is formed from three parts, namely a frame 36, a track structure 38 and a slidable member 40 all of which are formed of black plastics material.

Figure 7:
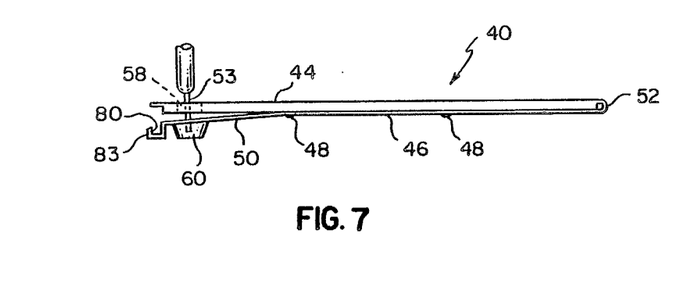
FIG. 7 is a view of the component illustrated in FIG. 6, but in a folded condition, and, for the sake of illustration, with a probe shown deflecting a portion of the component.

The slidable member 40 is formed from an elongate generally rectangular piece 42 of plastics material (see FIG. 6), each half 44, 46 of which may be regarded as forming a leaf. During manufacture, the two leaves 44 and 46 are folded so that they lie against one another (see FIG. 7). The two leaves are secured together, as by stakes 48 on the leaf 44 extending through apertures in the leaf 46 and burred over by heat to form a rivet like connection. A portion 50 of the leaf 46 remote from the fold line 52, is not directly secured to the leaf 44 and, as may be seen in FIG. 7, is resiliently deflectable away from the leaf 44, as by the force of a probe 53 bearing on it. The plastics material forming the Piece 42 is opaque to light and is selected so that the leaf 46 is flexible and resilient.

Figure 4:
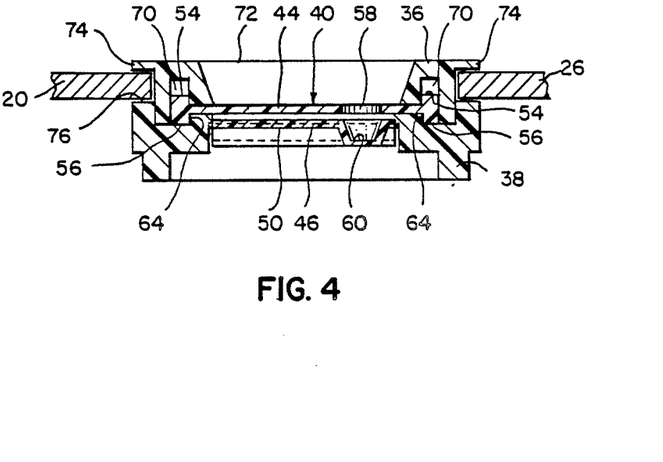
FIG. 4 is a sectional view taken on the line IV—IV in FIG. 2.

As may be seen in FIG. 4, the leaf 44 of the slidable member 40 is provided with upper and lower (as seen in FIG. 4) rails 54 and 56, respectively, at both its longitudinal edges. The rails 54 and 56 cooperate with tracks formed in the frame 36 and the track structure 38, as will subsequently be described. The leaf 46 is narrower than the leaf 44 so that its longitudinal edges are nested between and spaced from the lower rails 56 when in the folded condition illustrated in FIG. 7, as may be seen in FIG. 4.

The leaf 40 is provided with an aperture 58 in a region thereof overlying the deflectable region 50 of the other leaf 46. Exactly opposite the aperture 58, in the deflectable region 50 of the leaf 46, there is a detent 60 for receiving the end of the probe 53 which has been stuck through the aperture 58

Figure 2:
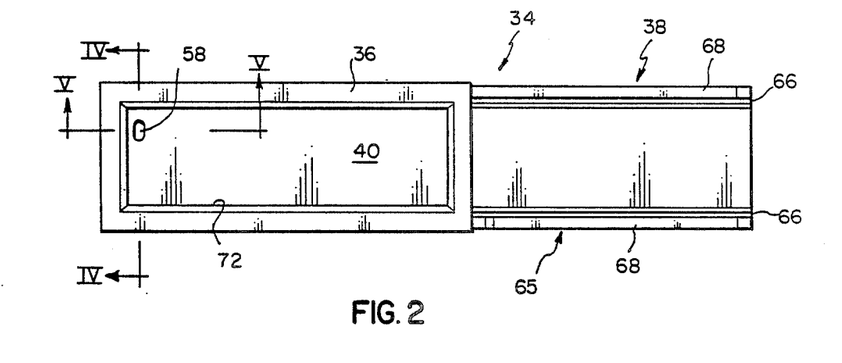
FIG. 2 is a view of a window device included in the cassette illustrated in FIG. 1, viewed from the same direction as it is in FIG. 1.
Figure 3:
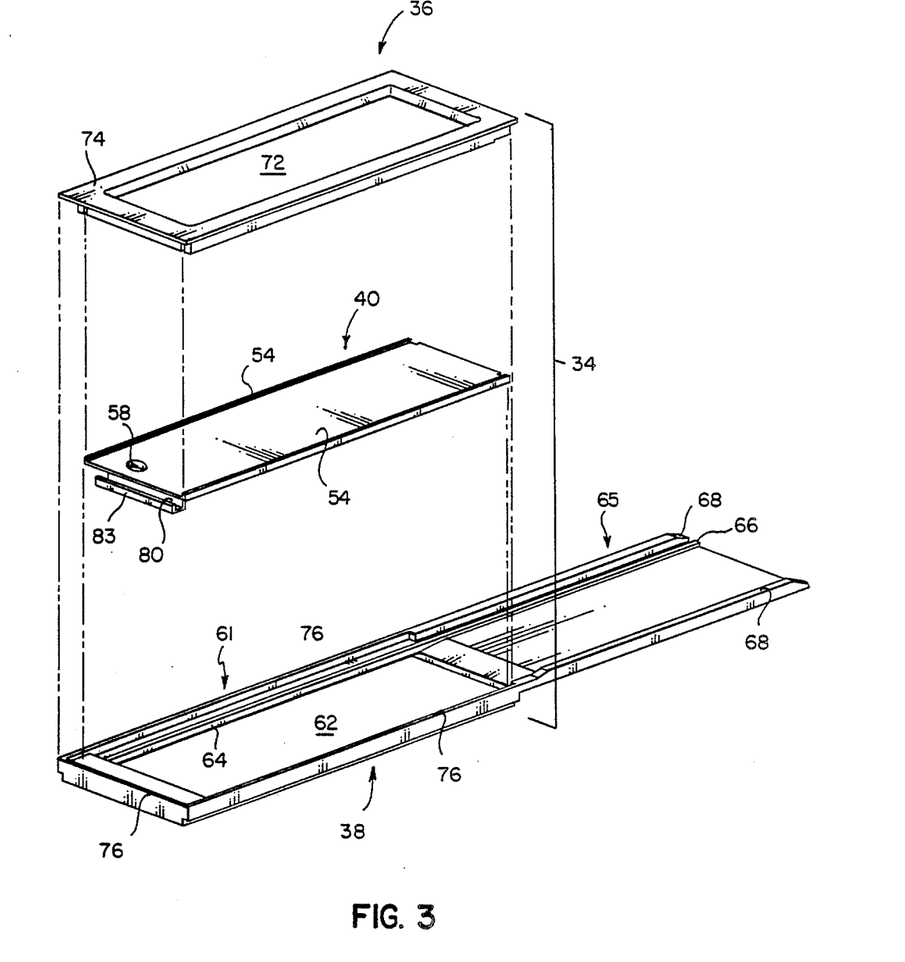
FIG. 3 is a perspective view of the window device illustrated in FIG. 2, but in an exploded condition, for the sake of illustration.

The track structure 38 is elongate, being somewhat more than twice the length of the slidable member 40. The left hand half 61 (as seen in FIG. 3) includes an aperture 62, which is closable the slidable member 40, and tracks 64 running alongside the aperture 62, for cooperation with the rails 56 on the slidable member 40. The right hand half 65 (as seen in FIGS. 2 and 3) of the track structure includes tracks 66 constituting integral extensions of the tracks 64 and, unlike the left hand half, tracks 68 adapted to cooperate with the rails 54 on the slidable member 40. The counterpart to the tracks 68 in relation to the left hand half of the window device 34 (as seen in FIGS. 2 and 3), is provided by tracks 70 on the frame 36. The tracks 64, 66, 68 and 70 cooperate with the rails 54 and 56 to guide the slidable member 40 in movement between a window closing position and a window opening position in which the slidable member 40 overlies the right hand half 61 of the track structure 38. The tracks and rails also form labyrinthine light seals when the slidable member 40 is in the window closing position. Furthermore, the cooperation of the tracks and rails serve to prevent the slidable member being popped inwardly through the aperture 62, as by a misplaced thumb, or even deformed to such extent as would destroy light integrity.

Figure 5:
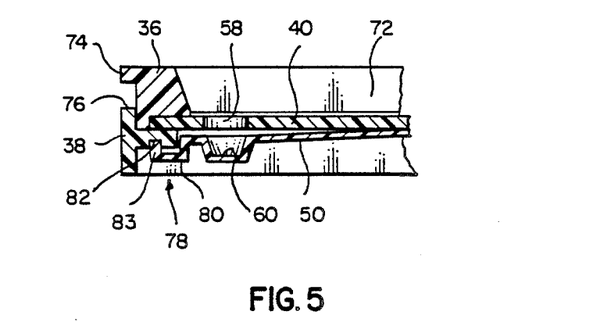
FIG. 5 is a sectional view taken on the line V—V in FIG. 2.
Figure 6:
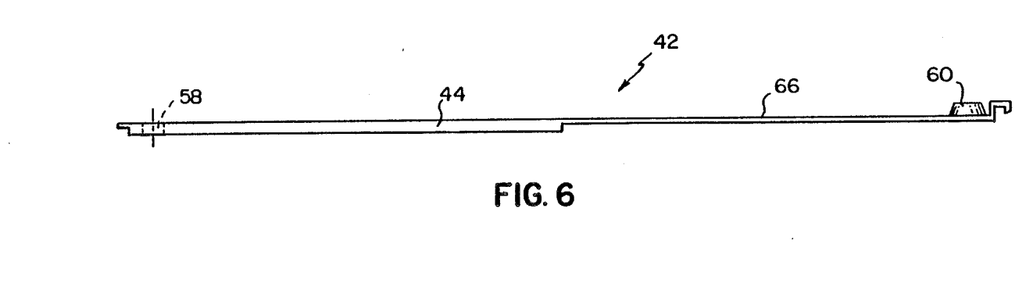
FIG. 6 is a side view of a component of the window device in a condition prior to being folded.

As can be seen in FIGS. 3, 4 and 5, the frame 36 has an aperture 72 which is aligned with the aperture 62 in the track structure 38 in the assembled condition. The frame 36 also has a flange 74 extending outwardly, in the general plane of the frame, at all four sides. Facing the flange 74 on three sides of the apertures 62, 72 (the remaining, fourth side is that adjacent the right hand half of the track structure 38) is a shoulder 76 on the track structure 38. When the window device is assembled with the housing of the cassette 20, the flange 74 and the shoulder 76 are located at opposite sides of the panel 26 (see FIG. 4). The frame is disposed at the outside of the cassette panel 26 and projects through an aperture in the panel 26, the aperture being a close fit with the frame. The track structure 38, with the slidable member associated therewith, is mated with the frame. Adhesive bonds the frame and track structure together. In this condition the flange 74 and shoulder 76 grip the panel 26 and serve as components of a labyrinthine light seal preventing light entering the cassette between the window device and the panel. At the fourth side of the apertures 62, 72, i.e that adjacent the right hand half 65 of the track structure 38, where the shoulder 76 does not exist, the light seal is provided by the flange 74, the panel 26, the slidable member 40 and the right hand half 65 of the track structure 38.

The window device 34 includes a releasable catch 78 for retaining the slidable member 40 in the closed position in which it is illustrated in FIGS. 1, 2, 4 and 5. The catch 78 includes catch means on the deflectable portion 50 of the slidable member 40 and other catch means associated with the housing. As can be seen in FIGS. 3 and 5, the catch means associated with the slidable member includes a U shaped channel 80 integral with the end of the deflectable portion 50 of the slidable member 50. The other catch means associated with the housing is in the form of a groove 82 formed in the track structure which is, as described above, secured to the housing. The groove 82 is adapted to receive a free edge portion 83 of the U shaped channel 80 when the slidable member is in the window closing position. The channel 80 is biassed into the groove 82 by the resilience of the deflectable portion of the slidable member. The catch is released by sticking a probe 53 through the aperture 58 in the slidable member 40 so that its end initially engages the detent 60 and then deflects the deflectable portion 50 of the slidable member so that the free edge portion 83 of the channel 80 is moved out of the groove 82. The slidable member is then free to be moved towards the window opening position which can be effected by lateral displacement of the probe 53 which then engages the slidable member at the boundary of the aperture 58. The slidable member is moved to the window closing position by drawing it along with the probe while deflecting the deflectable portion 50. When in the closed position, the probe is withdrawn, allowing the free edge portion 83 of the channel 80 to move into the groove 82.

Figure 8:
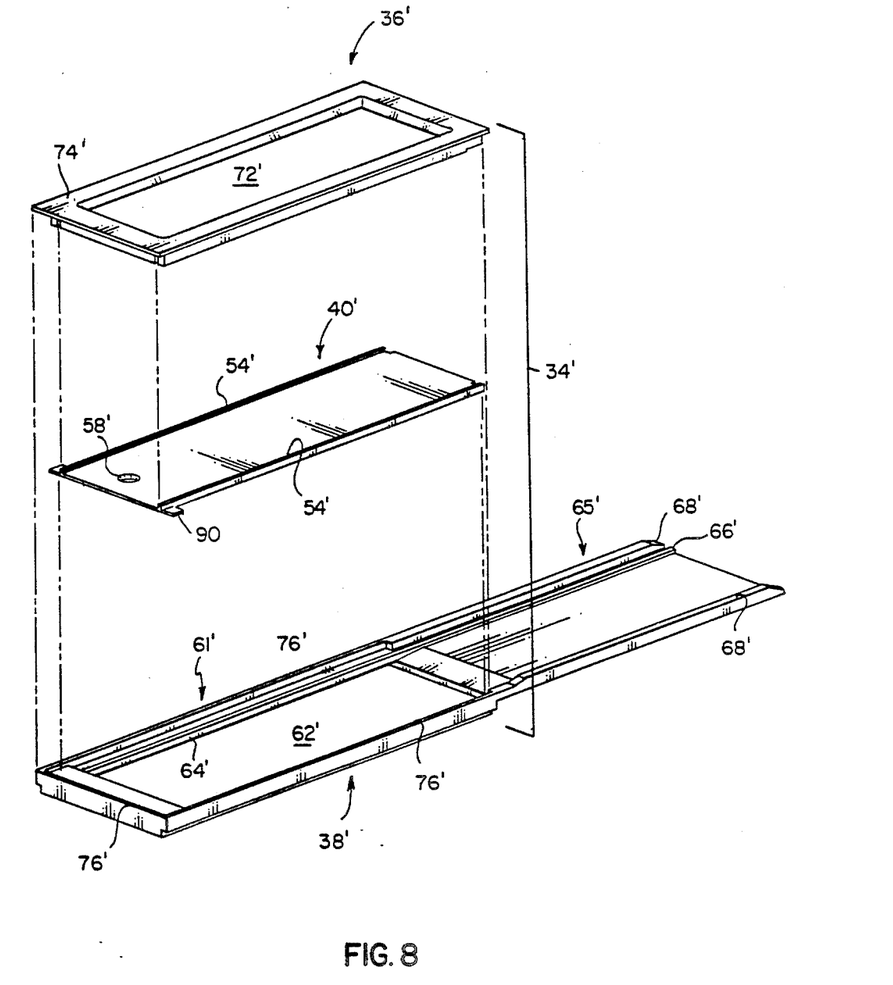
FIG. 8 is a view, similar to FIG. 3, but showing a second embodiment of a window device usable in a cassette in accordance with the present invention.
Figure 9:
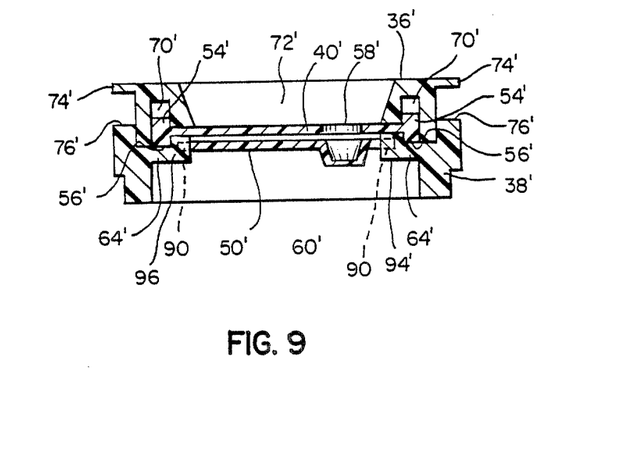
FIG. 9 is a view similar to that of FIG. 4, but showing the second embodiment of the window device.
Figure 10:
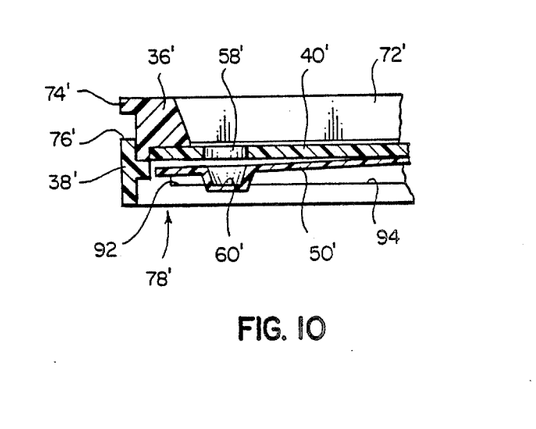
FIG. 10 is a view similar to that of FIG. 5, but showing the second embodiment of the window device.

FIGS. 8 to 10 illustrate a second embodiment of the present invention which is generally similar to the first, above described embodiment. The difference lies in the form of the catch for retaining the slidable member in the closed position. Only those aspects of the second embodiment which differ from the first embodiment will now be described. For an understanding of features and working of the second embodiment not specifically described, reference should be made to the description above of the first embodiment. Features in the second embodiment which correspond to features in the first embodiment will be given the same reference numerals as the features to which they correspond in the first embodiment, but with the addition of a prime (') suffix.

Figure 11:
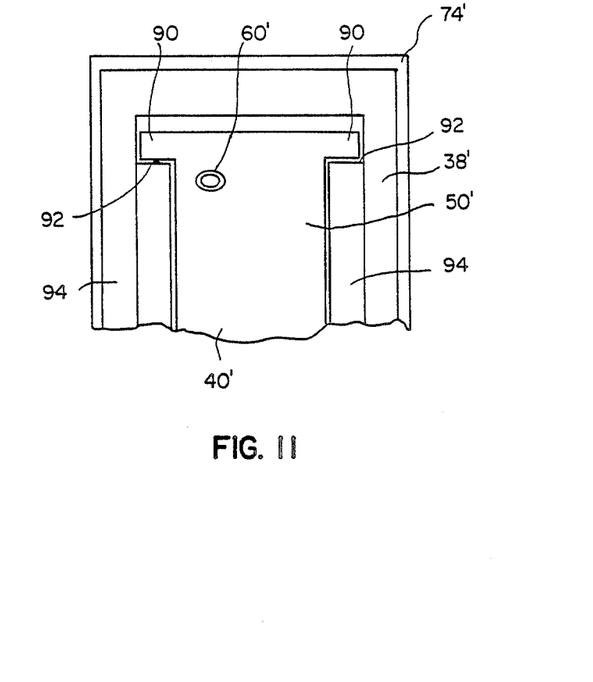
FIG. 11 is a plan view of a portion of the window device of the second embodiment, as seen from the inside of the cassette.

The catch 78' of the second embodiment again relies on the resilient deflectability of the portion 50' of the slidable member 40'. Again, it is operated by sticking a probe through the aperture 58' in the slidable member 40' so that it engages the detent 60' and deflects the portion 50 However, in this embodiment, the channel 80 and groove 82 are replaced by ears 90 and shoulders 92. The ears 90 are coplanar with the deflectable portion 50' of the slidable member 40' and extend laterally therefrom a the free end thereof, as may be seen in FIG.

11. When the slidable member 40' is in the window closing position, the resilience of the deflectable portion 50' causes it to assume an undeflected position in which the ears 90 are juxtaposed with the shoulders and the shoulders 92 lie in the path of the ears if the slidable member should be biassed to move in an opening direction. Insertion of a probe 53 through the aperture 58' deflects the portion 50' and displaces the ears 90 out of juxtaposition with the shoulders so that the slidable member can be moved to the open position. The shoulders 92 are formed on ends of flanges 94 forming integral parts of the track structure 38'.

The invention has been described in detail with particular reference to presently preferred embodiments, but it will be understood that variations and modifications can be effected within the spirit and scope of the invention.

What is claimed is:

1. An X-ray film cassette including a housing for receiving a sheet of X-ray film for exposure to X radiation and for excluding light from the film, said housing having a window adapted to allow light to be incident on a predetermined region of a sheet of film in the housing, the window including a member slidable relative to the remainder of the housing between a closed position excluding light from said region and an open position allowing light to pass to said region, the slidable member having been formed from a single generally elongate rectangular piece of plastics material and having been folded about a line at about the middle of the length of the unfolded piece of plastics material to form two leaves, a first of said leaves being substantially stiff and facing the outside of the housing, the second of the leaves being secured to the first of the leaves except adjacent the free end thereof remote from the fold line whereby the free end portion is resiliently deflectable away from the first leaf, the free end portion of the second leaf having catch means, the housing including other catch means adjacent but not on the slidable member, said first leaf having an aperture in a region thereof overlying the free end portion of the second leaf, said aperture being adapted to allow access of a probe for deflecting the free end portion of the second leaf, said catch means and said other catch means being cooperable with one another for preventing movement of the slidable member from the aperture closing position when the free end portion of the second leaf is in an undeflected condition and for allowing sliding movement of the slidable member from the aperture closing position when the free en portion is in a deflected condition.

2. An X-ray film cassette as claimed in claim 1, wherein the catch means at the free end portion of the second leaf includes a tongue, and the other catch means includes a groove for receiving the tip of the tongue.

3. An X-ray film cassette as claimed in claim 2, wherein the tongue is in the form of a channel of general U shape in section and extending the full width of the second leaf of the slidable member.

4. An X-ray film cassette as claimed in claim 1, wherein the catch means is at the free end of the second leaf of the slidable member and is in the form of ears extending laterally in the general plane of the slidable member, and the other catch means includes shoulders in the path of the ears when the slidable member tends to move away from the closed position with the free end portion of the second leaf in the non deflected position, and located out of the path of the ears when the slidable member moves away from the closed position with the free end portion of the second leaf in the deflected condition.

5. An X-ray film cassette as claimed in any one of the preceding claims, wherein the window further includes a frame and a track member, the slidable member having rails, the frame and the track member having tracks cooperable with the rails for guiding the slidable member in movement between the window opening and window closing positions of the slidable member.

* * * * *